(12) United States Patent
Kimura et al.

(10) Patent No.: US 11,268,424 B2
(45) Date of Patent: Mar. 8, 2022

(54) EXHAUST GAS PURIFICATION DEVICE

(71) Applicant: Nissin Kogyo Co., Ltd., Yamato (JP)

(72) Inventors: Koichi Kimura, Tochigi (JP); Sachiko Yoshizawa, Tochigi (JP); Kenichi Miyazawa, Tochigi (JP)

(73) Assignee: Nissin Kogyo Co., Ltd., Yamato (JP)

( * ) Notice: Subject to any disclaimer, the term of this patent is extended or adjusted under 35 U.S.C. 154(b) by 0 days.

(21) Appl. No.: 17/097,234

(22) Filed: Nov. 13, 2020

(65) Prior Publication Data

US 2021/0062703 A1    Mar. 4, 2021

Related U.S. Application Data

(63) Continuation of application No. PCT/JP2019/019495, filed on May 16, 2019.

(30) Foreign Application Priority Data

May 16, 2018 (JP) .............................. JP2018-094778

(51) Int. Cl.
  *F01N 3/28* (2006.01)
  *B01F 3/04* (2006.01)
  *B01F 5/00* (2006.01)

(52) U.S. Cl.
  CPC ........ *F01N 3/2892* (2013.01); *B01F 3/04049* (2013.01); *B01F 2005/0091* (2013.01); *F01N 2240/20* (2013.01)

(58) Field of Classification Search
  CPC .... F01N 3/2892; F01N 3/0253; F01N 3/0293; F01N 3/206; F01N 3/2066; F01N 3/2053;
  (Continued)

(56) References Cited

U.S. PATENT DOCUMENTS

| 2012/0216513 A1* | 8/2012 | Greber | F01N 3/2066 60/295 |
| 2015/0202569 A1* | 7/2015 | Kimura | B01F 5/0057 422/148 |

(Continued)

FOREIGN PATENT DOCUMENTS

| JP | 201199333 A | 5/2011 |
| JP | 201425378 A | 2/2014 |
| JP | 2014190177 A | 10/2014 |

*Primary Examiner* — Devon C Kramer
*Assistant Examiner* — Kelsey L Stanek
(74) *Attorney, Agent, or Firm* — The Webb Law Firm

(57) ABSTRACT

An exhaust gas purification device includes a selective catalytic reduction (SCR) device arranged in a downstream exhaust flow path, and a mixer arranged upstream of the selective catalytic reduction device and including a helical flow path that helically guides the flow of exhaust gas from an internal combustion engine. In the exhaust gas purification device, the mixer includes a casing, an injector, and a partition plate. The casing has an upstream opening and a downstream opening and is provided with the helical flow path therein. The injector is arranged in the helical flow path to add a reducing agent to the helical flow path. The partition plate is continuous from the upstream opening to the downstream opening. The partition plate is arranged to divide the inner space of the casing into an upstream side and a downstream side, and defines the helical flow path.

12 Claims, 15 Drawing Sheets

(58) Field of Classification Search
CPC ............ F01N 2610/02; F01N 2610/03; F01N 2240/20; B01F 5/0473; B01F 5/0608; B01F 3/04049; B01F 2005/0091
USPC .................................................. 60/295, 324
See application file for complete search history.

(56) References Cited

U.S. PATENT DOCUMENTS

| | | | |
|---|---|---|---|
| 2016/0319724 A1* | 11/2016 | Alano | B01F 5/0614 |
| 2017/0089246 A1 | 3/2017 | Greber et al. | |
| 2017/0152782 A1* | 6/2017 | Petry | B01F 5/0065 |
| 2019/0010850 A1* | 1/2019 | Willats | F01N 3/2066 |
| 2019/0201854 A1* | 7/2019 | Cvelbar | B01D 53/94 |
| 2019/0211732 A1* | 7/2019 | Haverkamp | B01F 5/0608 |
| 2020/0173330 A1* | 6/2020 | Tucker | B01F 5/0608 |
| 2020/0325811 A1* | 10/2020 | Levin | F01N 3/206 |

* cited by examiner

EXHAUST GAS PURIFICATION DEVICE

CROSS-REFERENCE TO RELATED APPLICATIONS

This patent application is a continuation of International Application No. PCT/JP2019/019495 filed May 16, 2019, and claims priority to Japanese Patent Application No. 2018-094778 filed May 16, 2018, the disclosures of which are hereby incorporated by reference in their entirety.

BACKGROUND

Field of the Disclosure

Embodiments described herein relate generally to an exhaust gas purification device.

Description of Related Art

A urea selective catalytic reduction (SCR) system has been known as an exhaust gas purification device for an internal combustion engine such as a diesel engine. The urea SCR system includes an injector that injects urea water as a reducing agent into an exhaust flow path, and a reduction catalyst arranged downstream of the injector in the exhaust flow path.

In the conventional urea SCR system, when the injector injects urea water into the exhaust gas, the injected urea water undergoes a thermal decomposition and hydrolysis to produce ammonia ($NH_3$). Nitrogen oxides (NOx) in the exhaust gas are reduced by the produced $NH_3$ to nitrogen ($N_2$) and water ($H_2O$) in the reduction catalyst. In this manner, the conventional exhaust gas purification device selectively reduces NOx in the exhaust gas to purify it, thereby making the exhaust gas harmless.

There is also a conventional exhaust gas purification device in which a mixer having a helical exhaust flow path is located upstream of the reduction catalyst, and a reducing agent is injected into the exhaust flow path to promote mixing of the exhaust gas and the reducing agent (reference may be had to, for example, Japanese Laid-Open Patent Publication No. 2014-190177).

However, for example, in the conventional exhaust gas purification device as described above, the mixer needs a complex structure to increase the homogeneity of the reducing agent in the exhaust gas, resulting in an increase in its size. In addition, the pressure loss of the exhaust gas becomes greater, which increases the back pressure on the internal combustion engine. Thus, the degree of freedom decreases in the design of the entire vehicle, which is not preferable.

DETAILED DESCRIPTION

Figure 1:
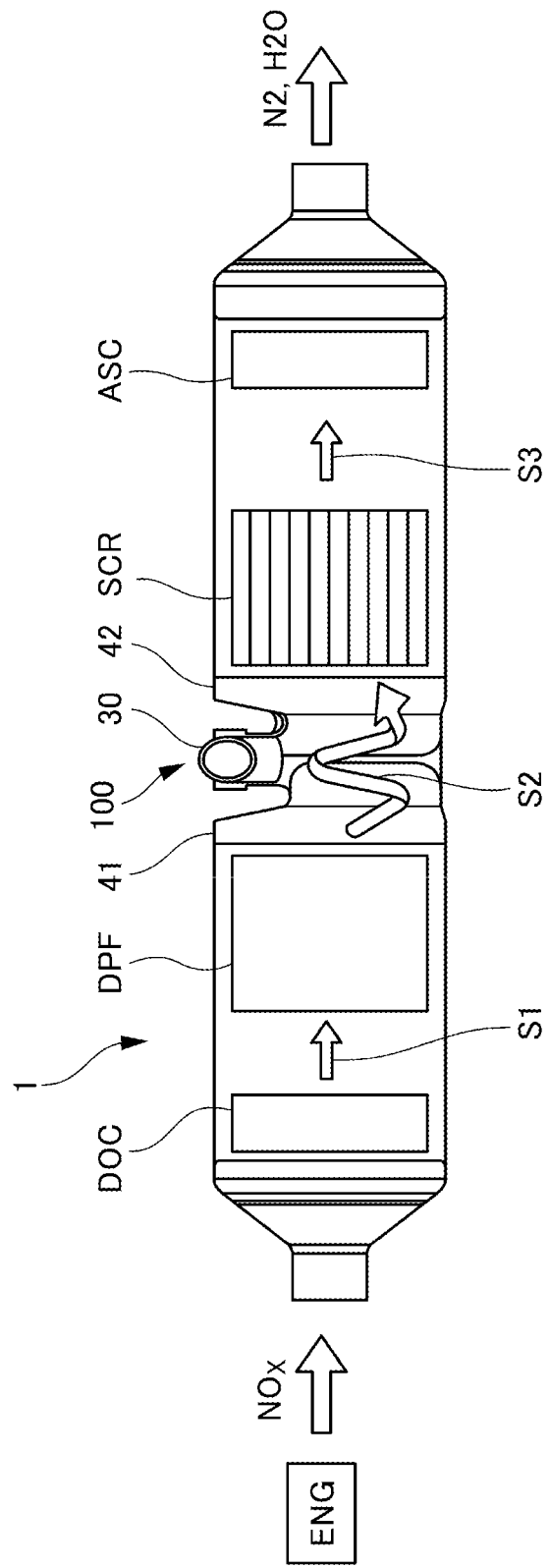
FIG. 1 is a front view of an exhaust gas purification device according to an embodiment.

In general, according to one embodiment, an exhaust gas purification device includes: a selective catalytic reduction device located in a downstream exhaust flow path; and a mixer located upstream of the selective catalytic reduction device and including a helical flow path that helically guides a flow of exhaust gas from an internal combustion engine. The mixer includes a casing, a partition plate, and an injector. The casing includes a cylindrical first case that forms an upstream opening on one end, and a cylindrical second case that forms a downstream opening on one end. Another end of the first case is coupled to another end of the second case. The casing has a cylindrical inner space where the upstream opening and the downstream opening directly communicate with each other. The partition plate is formed of a piece separate from the casing, and coupled to the first case and the second case. The partition plate is configured to divide the cylindrical inner space of the casing into an upstream side and a downstream side so as to define the helical flow path in the cylindrical inner space of the casing. The injector is configured to add a reducing agent to the helical flow path.

Embodiments

In the following, illustrative embodiments will be described in detail with reference to the accompanying drawings. Note that like parts are designated by like reference numerals or characters throughout the description of the embodiments.

FIG. 1 is a front view of an exhaust gas purification device 1 according to an embodiment. In FIG. 1, white arrows indicate the direction in which exhaust gas flows.

The exhaust gas purification device 1 of the embodiment is a device that purifies exhaust gas discharged from an internal combustion engine ENG such as a diesel engine, and is installed downstream of the flow of the exhaust gas. The exhaust gas purification device 1 is, for example, a selective catalytic reduction (SCR) purification system that selectively reduces nitrogen oxides NOx in the exhaust gas discharged from the internal combustion engine ENG using urea water (urea aqueous solution) as a reducing agent.

As illustrated in FIG. 1, the exhaust gas purification device 1 is linear as a whole, and includes an exhaust flow path S formed of an upstream exhaust flow path S1, a helical flow path S2, and a downstream exhaust flow path S3 inside an airtight sleeve. The upstream exhaust flow path S1, the helical flow path S2, and the downstream exhaust flow path S3 are formed continuously in this order from the upstream. The upstream exhaust flow path S1 and the downstream exhaust flow path S3 are defined by cylindrical containers. Each of the upstream exhaust flow path S1 and the downstream exhaust flow path S3 (inner space of the containers) has a round cross section to reduce the pressure loss as much as possible.

Specifically, the exhaust gas purification device 1 includes a diesel oxidation catalyst DOC arranged in the upstream exhaust flow path S1, a diesel particulate filter DPF arranged in the upstream exhaust flow path S1, and a selective catalytic reduction system SCR that supports a reduction catalyst, which is arranged in the downstream exhaust flow path S3. The exhaust gas purification device 1 may further include, as appropriate, an ammonia slip catalyst ASC. The ammonia slip catalyst ASC is an oxidation catalyst and is arranged downstream of the selective catalytic reduction system SCR in the downstream exhaust flow path S3 to prevent ammonia NH3 from passing through and being released into the outside air.

The oxidation catalyst DOC oxidatively purifies hydrocarbon HC and carbon monoxide CO, which are harmful components in the exhaust gas. The oxidation catalyst DOC may be a ceramic honeycomb, a metal mesh, or the like coated with a catalyst component such as platinum or palladium that promotes the oxidation of hydrocarbon HC and carbon monoxide CO.

The diesel particulate filter DPF is a filter that collects or removes particulate matter from the exhaust gas.

The selective catalytic reduction system SCR may be made from a porous ceramic substrate such as, for example, cordierite, which is coated with a catalyst such as zeolite, vanadium oxide, or tungsten oxide.

The exhaust gas purification device 1 includes a mixer 100 that is arranged upstream of the selective catalytic reduction system SCR that supports a reduction catalyst. The mixer 100 is provided with a helical flow path S2 that helically guides the flow of exhaust gas from the internal combustion engine ENG.

The mixer 100 includes an injector 30 that injects urea water as a reducing agent into the helical flow path S2.

In the exhaust gas purification device 1, when the injector 30 injects urea water into the exhaust gas flowing through the helical flow path S2, the injected urea water undergoes a thermal decomposition and hydrolysis to produce ammonia NH3. As a result, nitrogen oxides NOx in the exhaust gas are reduced by the produced ammonia NH3 to nitrogen N2 and water H2O in the selective catalytic reduction system SCR. The nitrogen N2 and water H2O are released into the outside air.

In this manner, the exhaust gas purification device 1 selectively reduces nitrogen oxides NOx in the exhaust gas to purify it, thereby making the exhaust gas harmless.

(Mixer 100)

Next, the mixer 100 will be described in detail.

Figure 2:
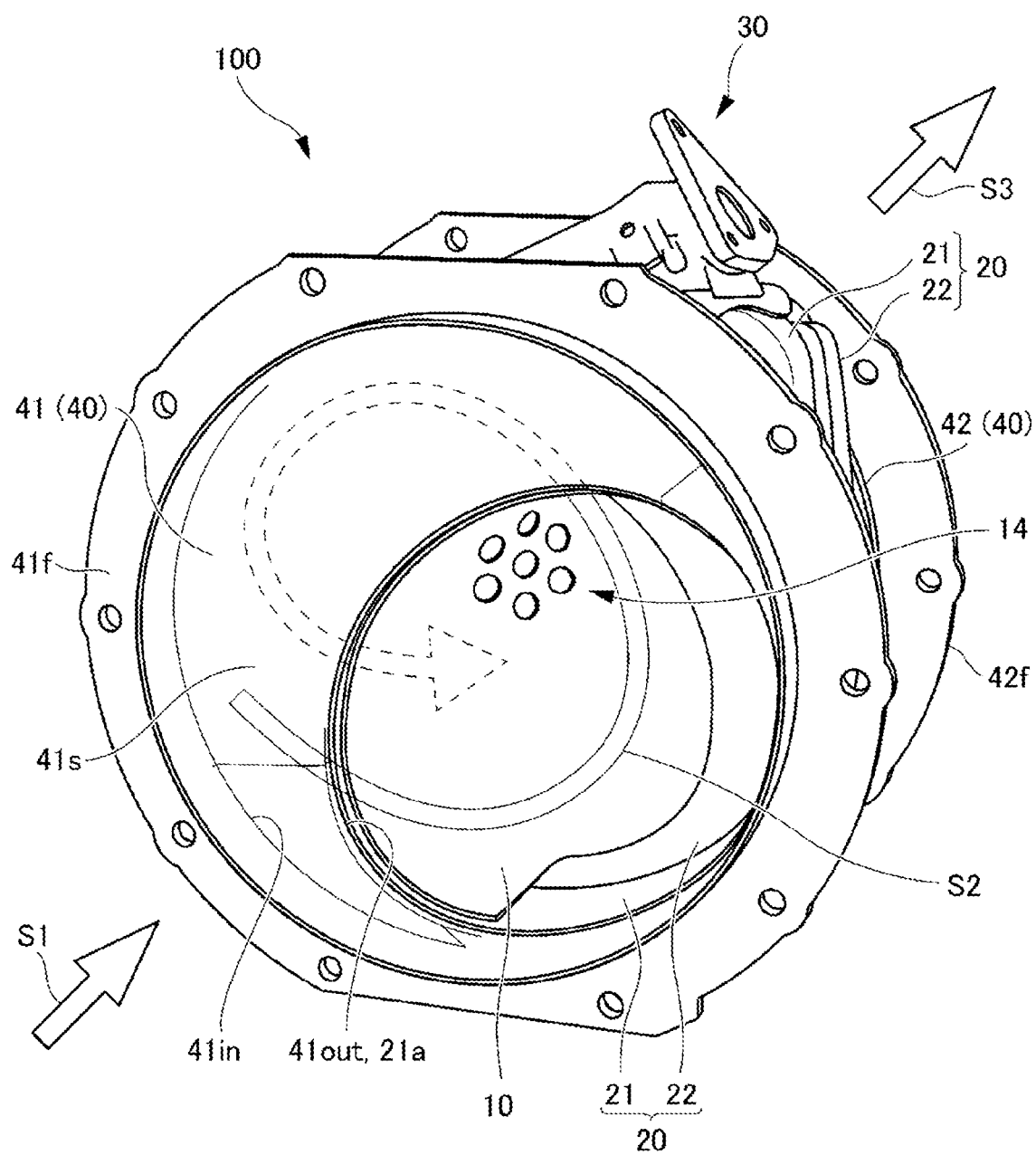
FIG. 2 is a perspective view of a mixer viewed from the upstream.
Figure 3:
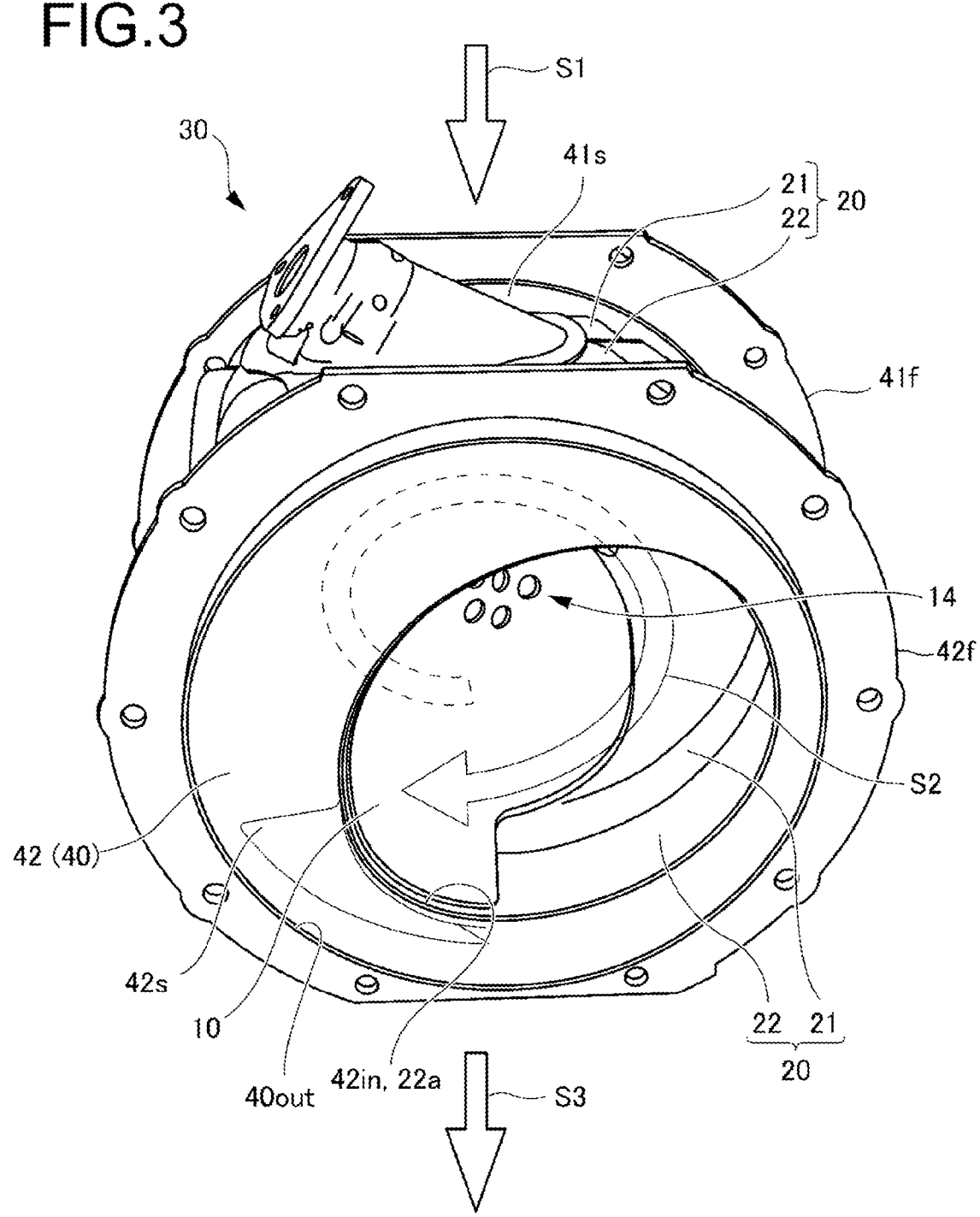
FIG. 3 is a perspective view of the mixer viewed from the downstream.
Figure 7:
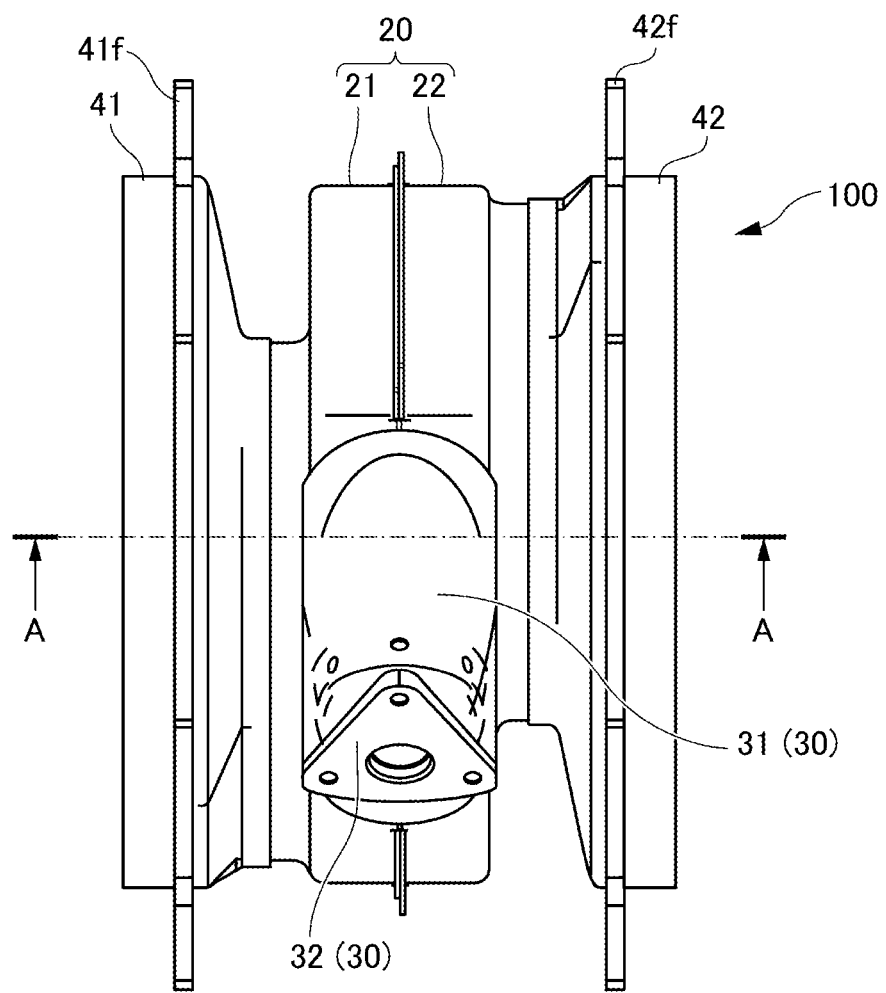
FIG. 7 is a plan view of the mixer.
Figure 8:
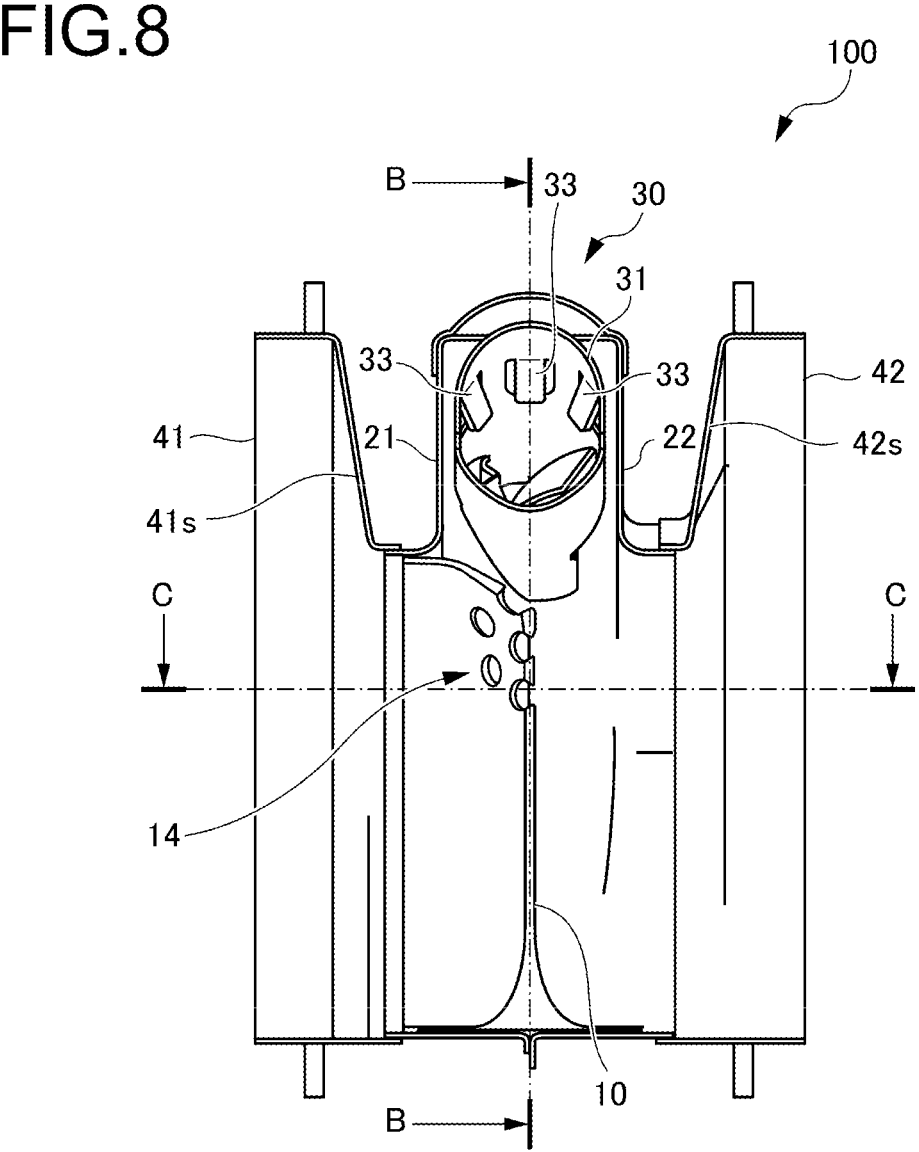
FIG. 8 is a cross-sectional view taken along the line A-A in FIG. 7.
Figure 9:
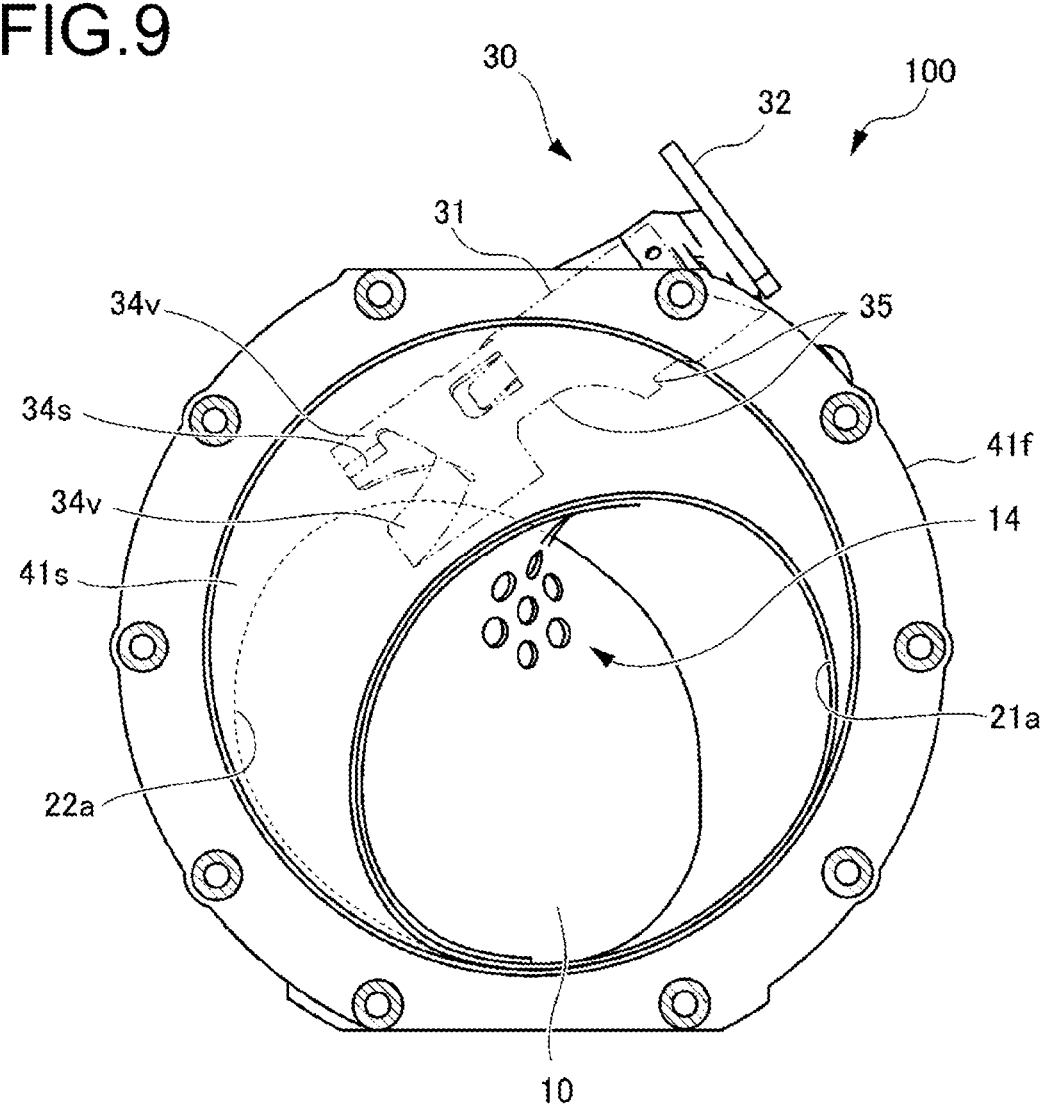
FIG. 9 is a left side view of the mixer.
Figure 10:
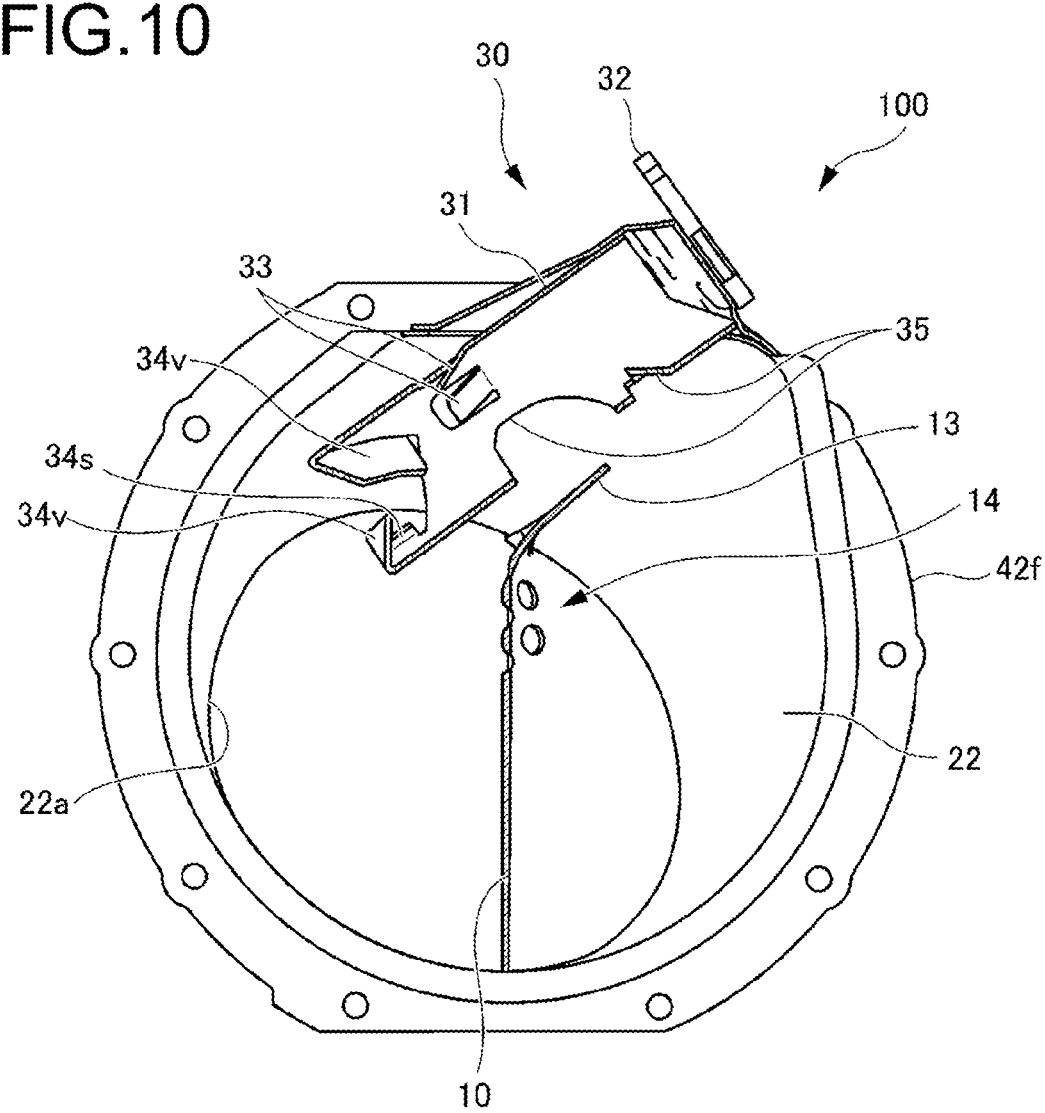
FIG. 10 is a cross-sectional view taken along the line B-B in FIG. 8.
Figure 11:
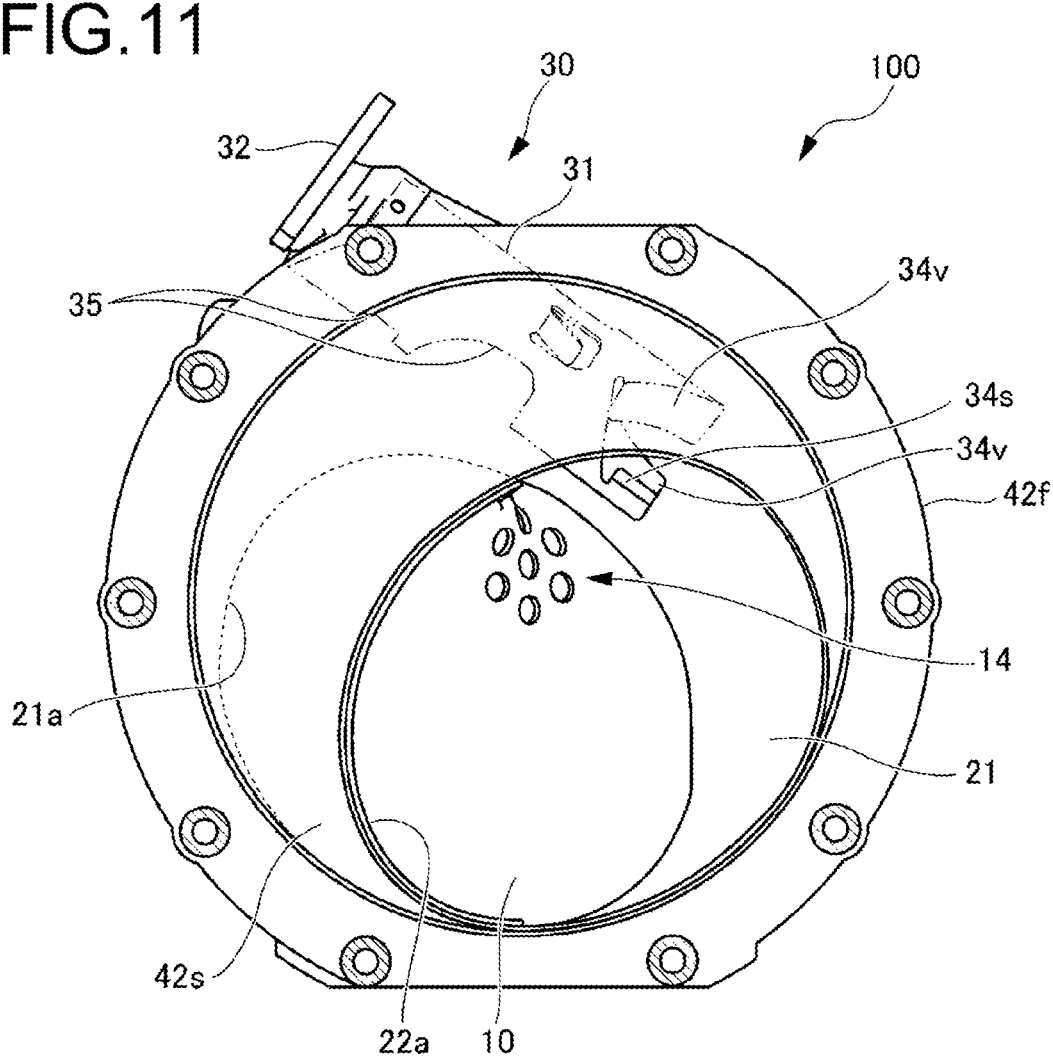
FIG. 11 is a right side view of the mixer.
Figure 12:
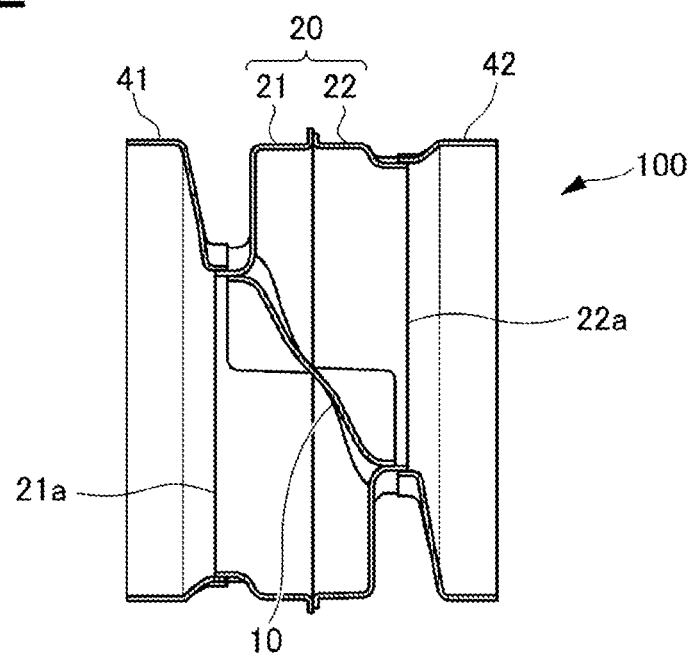
FIG. 12 is a cross-sectional view taken along the line C-C in FIG. 8.

FIG. 2 is a perspective view of the mixer 100 viewed from the upstream. FIG. 3 is a perspective view of the mixer 100 viewed from the downstream. FIG. 7 is a plan view of the mixer 100. FIG. 8 is a cross-sectional view taken along the line A-A in FIG. 7. FIG. 9 is a left side view of the mixer 100. FIG. 10 is a cross-sectional view taken along the line B-B in FIG. 8. FIG. 11 is a right side view of the mixer 100. FIG. 12 is a cross-sectional view taken along the line C-C in FIG. 8.

As illustrated in FIGS. 2 and 3, the mixer 100 includes: a cylindrical casing 20; a partition plate 10 that is arranged so as to divide the inner space of the casing 20 into an upstream side and a downstream side, and defines the helical flow path S2 together with the casing 20; the injector arranged to protrude into the helical flow path S2 to add a reducing agent to the helical flow path S2; and a reducer 40 arranged in a transition portion from the upstream exhaust flow path S1 to the casing 20 as well as a transition portion from the casing 20 to the downstream exhaust flow path S3.

By virtue of this configuration of the mixer 100, even if the helical flow path S2 is short (even if the inner space of the casing 20 is narrow or the distance from an upstream opening 21a to a downstream opening 22a is short), the flow rate of the exhaust gas passing through the mixer 100 can be increased as the direction of the flow is being changed helically. Thereby, the reducing agent can be uniformly diffused and mixed in the exhaust gas, and also the reducing agent is prevented from adhering to the inside of the casing 20.

In the following, each part of the mixer 100 will be described.

(Casing 20 and Partition Plate 10)

Figure 4:
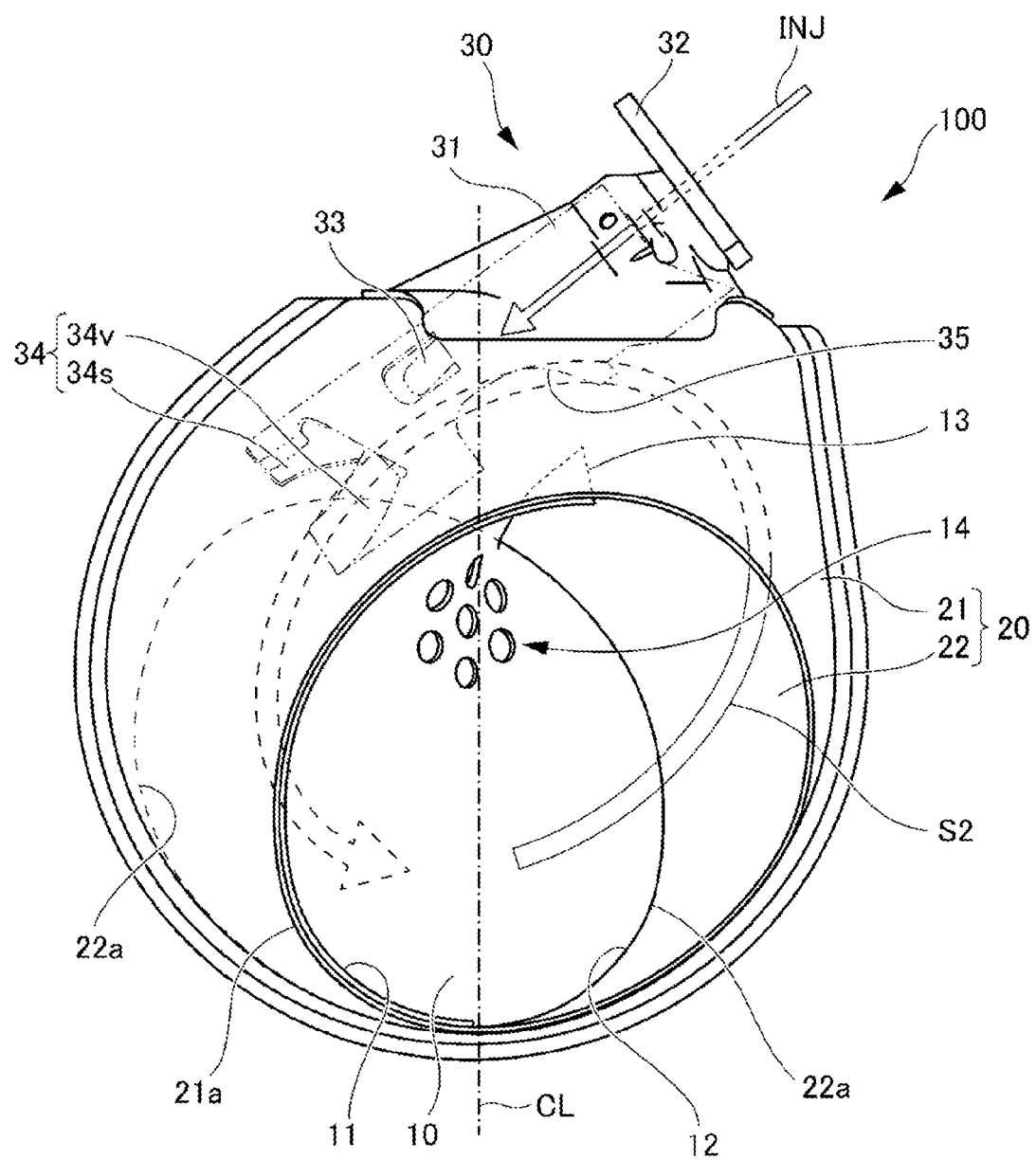
FIG. 4 is a left side view of the mixer in which a reducer is not illustrated.

The casing 20 and the partition plate 10 of the mixer 100 will be described mainly with reference to FIGS. 2 to 4. FIG. 4 is a left side view of the mixer 100 in which a reducer is not illustrated.

As illustrated in FIGS. 2 to 4, the casing 20 is substantially annular in shape as viewed in the flow direction (in FIGS. 2 and 3, the direction of the arrow that indicates the upstream exhaust flow path S1 and the downstream exhaust flow path S3, i.e., the direction viewed from the left side; hereinafter the same applies unless otherwise specified), and has a cylindrical shape having a predetermined length in the flow direction. The casing 20 defines the helical flow path S2 together with the partition plate 10.

The casing 20 includes an upstream casing 21 and a downstream casing 22. The upstream casing 21 and the downstream casing 22 have the upstream opening 21a narrower than the upstream exhaust flow path S1 and the downstream opening 22a narrower than the downstream exhaust flow path S3, respectively. With this, it is possible to smoothly deflect the flow of the exhaust gas from the upstream exhaust flow path S1 toward the helical flow path S2 while smoothly increasing the flow rate in the upstream casing 21. It is also possible to smoothly deflect the flow of the exhaust gas from the helical flow path S2 toward the downstream exhaust flow path S3 while smoothly reducing the flow rate in the downstream casing 22.

The upstream opening 21a and the downstream opening 22a are arranged substantially parallel to each other. Further, the upstream opening 21a and the downstream opening 22a are arranged substantially perpendicular to the flow direction. The upstream casing 21 and the downstream casing 22 are separate and configured to be assembled together as abutting each other, which facilitates the installation of the partition plate 10 and the injector 30.

As illustrated in FIG. 4, the upstream opening 21a is arranged eccentrically opposite to the location of the injector 30 with respect to the center of the casing 20 as viewed in the flow direction. Specifically, the injector 30 is located in the upper left part as viewed in the flow direction, while the upstream opening 21a is located in the lower right part of the upstream casing 21. Instead, the arrangement of the injector 30 can be horizontally reversed as viewed in the flow direction such that the mixer 100 has a horizontally reversed structure.

Besides, the upstream opening 21a is arranged so as not to overlap the position of the injector 30 as viewed in the flow direction. Thereby, the injector 30 can be arranged along the helical flow path S2 so as to protrude into the inner space of the casing 20. Thus, the reducing agent can be efficiently added to and mixed with the exhaust gas.

The length of the helical flow path S2, i.e., the length of the line running from the center of the upstream opening 21a to the center of the downstream opening 22a through the cross-sectional center of the flow path where the exhaust gas flows, may be approximately one turn (360 degrees) or less than one turn of the inner space of the casing 20 as indicated by the arrow in FIG. 4. As described above, the mixer 100 can efficiently mix the reducing agent into the exhaust gas even if the length of the helical flow path S2 is short. Thus, the casing 20, i.e., the mixer 100, and also the exhaust gas purification device 1 can be made compact.

Specifically, the upstream opening 21a has an elliptical shape as viewed in the flow direction, and is arranged such that a portion with a small curvature in the elliptical shape (lower right portion) is inscribed in the outer shape of the casing 20. With this, the exhaust gas can be smoothly guided from the upstream opening 21a to the inner space of the casing 20.

As illustrated in FIG. 4, the downstream opening 22a is arranged symmetrically to the upstream opening 21a with respect to the vertical center line CL of the casing 20 as viewed in the flow direction. Specifically, the upstream opening 21a is located in the lower right part as viewed in the flow direction, while the downstream opening 22a is located in the lower left part of the downstream casing 22 as viewed in the flow direction. The downstream opening 22a has an elliptical shape as viewed in the flow direction, and is arranged such that a portion with a small curvature in the elliptical shape (lower left portion) is inscribed in the outer shape of the casing 20.

The downstream opening 22a has the same shape as the upstream opening 21a. Thereby, in the partition plate 10, an upstream connection portion 11 on the upstream side and a downstream connection portion 12 on the downstream side connected to the casing 20 can be made in the same shape, which facilitates the manufacture of the partition plate 10.

Further, the upstream opening 21a and the downstream opening 22a are arranged so as to partially overlap with each other as viewed in the flow direction. For example, as illustrated in FIG. 4, the portion where the upstream opening 21a and the downstream opening 22a overlap is in a tear-drop shape. This results in a shorter distance between the upstream opening 21a and the downstream opening 22a, and therefore the partition plate 10 can be tabular as a whole. Thus, the partition plate 10 can be made as small as possible and light in weight. In addition, the partition plate 10 can be formed in a substantially symmetrical shape in a plan view (see FIG. 12). With this, the same bending process can be applied to the upstream and downstream sides of the partition plate 10 (for example, they can be pressed with the same mold), which facilitates the manufacture of the partition plate 10.

Besides, the overlapping portion is formed in the center of the casing 20 as viewed in the flow direction. Thereby, the upstream opening 21a and the downstream opening 22a can be secured as large as possible, and the pressure loss due to passing through the mixer 100 can be reduced.

The injector 30 is located on the upper part of the casing 20 so as to protrude into the helical flow path S2 to add a reducing agent to the helical flow path S2. The injector 30 will be described later.

The mixer 100 includes, in the casing 20, the partition plate 10 that is continuous from the upstream opening 21a to the downstream opening 22a. The partition plate 10 is arranged so as to divide the inner space of the casing 20 into an upstream side and a downstream side, and defines the helical flow path S2.

With this, the exhaust gas from the upstream exhaust flow path S1 passes through the upstream opening 21a and is guided by the partition plate 10 to flow helically. Thereby, the reducing agent can be homogeneously mixed in the exhaust gas in a short distance, and the pressure loss of the exhaust gas can be reduced.

Specifically, the partition plate 10 is continuous from the left part of the upstream opening 21a to the right part of the downstream opening 22a as viewed in the flow direction.

The partition plate 10 includes the upstream connection portion 11 connected to the upstream opening 21a of the upstream casing 21, the downstream connection portion 12 connected to the downstream opening 22a of the downstream casing 22, a gate valve 13, and a pressure loss suppression hole 14.

The partition plate 10 is connected in an airtight manner to the casing 20 except for the upper end of the gate valve 13. Specifically, the upstream connection portion 11 and the downstream connection portion 12 are connected in an airtight manner to the upstream casing 21 and the downstream casing 22, respectively. The upstream and downstream sides of the lower end of the partition plate 10 are connected in an airtight manner to the upstream casing 21 and the downstream casing 22, respectively. Further, the upstream and downstream ends of the gate valve 13 are connected in an airtight manner to the upstream casing 21 and the downstream casing 22, respectively.

The upstream connection portion 11 is connected to the left part, i.e., a part on the left side of the vertical center line CL in the upstream opening 21a as viewed in the flow direction. The upstream connection portion 11 has the same shape as the left part of the upstream opening 21a.

Similarly, the downstream connection portion 12 is connected to the right part, i.e., a part on the right side of the vertical center line CL in the downstream opening 22a as viewed in the flow direction. The downstream connection portion 12 has the same shape as the right part of the downstream opening 22a.

As illustrated in FIG. 12, the upstream side of the partition plate 10, where the upstream connection portion 11 is connected to the upstream casing 21, is convexly curved from the center of the upstream opening 21a toward the center of the downstream opening 22a in a plan view. Similarly, the downstream side, where the downstream connection portion 12 is connected to the downstream casing 22, is convexly curved from the center of the downstream opening 22a toward the center of the upstream opening 21a.

As illustrated in FIGS. 8, 10, and 12, the partition plate 10 has a substantially linear cross section in a front view, a side view, and a plan view. Accordingly, the partition plate 10 can be easily manufactured by bending (pressing) using a flat plate as a material.

As mentioned above, the upstream opening 21a and the downstream opening 22a are arranged so as to partially overlap with each other as viewed in the flow direction, and the portion where the upstream opening 21a and the downstream opening 22a overlap is in a tear-drop shape. As with the portion where the upstream opening 21a and the downstream opening 22a overlap, the partition plate 10 has a tear-drop shape as viewed in the flow direction.

Besides, as viewed in the flow direction, the partition plate 10 is substantially symmetrical in the horizontal direction about the vertical center line CL of the portion where the upstream opening 21a and the downstream opening 22a overlap. This facilitates the processing of the partition plate 10.

The gate valve 13 is a plate-like tongue piece that prevents backflow, and is arranged in the upper part of the partition plate 10. The gate valve 13 is located in a transition portion between the upstream side and the downstream side in the inner space of the casing 20. The gate valve 13 extends across the upstream casing 21 and the downstream casing 22, and the upstream end is connected to the right part of the upstream opening 21a on the right side of the vertical center line CL, while the downstream end is connected to the right part of the downstream opening 22a on the right side of the vertical center line CL. The upper end of the gate valve 13 is open to the helical flow path S2. With this configuration, the gate valve 13 can separate the flow inside the upstream casing 21 from the flow inside the downstream casing 22. Thus, it is possible to prevent the flow from being stagnant due to backflow from the downstream side to the upstream side or the like, and the flow rate of the exhaust gas can be maintained in the helical flow path S2.

The pressure loss suppression hole 14 is a hole that allows the exhaust gas to pass from upstream to downstream. Specifically, the pressure loss suppression hole 14 allows the exhaust gas from the upstream exhaust flow path S1 to flow directly to the downstream exhaust flow path S3 without passing through the helical flow path S2, thereby reducing the pressure loss due to exhaust (smoothing changes in pressure). The pressure loss suppression hole 14 is located in substantially the center of the casing 20 as viewed in the flow direction. Besides, the pressure loss suppression hole 14 is arranged in the upper part of the partition plate 10.

As illustrated in FIG. 4, the pressure loss suppression hole 14 includes one hole in the center and six holes around it. A total of seven holes are arranged side by side at equal pitches such that lines connecting the centers of the six holes form a regular hexagon. With this, the main flow of the exhaust gas from the upstream exhaust flow path S1 helically flows through the helical flow path S2 in the inner space of the casing 20 while changing its direction, and reaches the downstream exhaust flow path S3. On the other hand, part of the exhaust gas from the upstream exhaust flow path S1 can pass through the pressure loss suppression hole 14 to reach the downstream exhaust flow path S3 with almost no change in the flow direction. As a result, the pressure loss of the exhaust gas can be reduced by the partition plate 10 (pressure changes in the space in front of and behind the partition plate 10 can be smoothed), and the back pressure of the internal combustion engine ENG can be reduced. Although, in the embodiment, the pressure loss suppression hole 14 includes seven holes as illustrated in FIG. 4, it is not so limited and there may be other number of holes or a single hole. The shape of the holes need not be perfectly circular, and the size of each hole may be changed as appropriate.

(Injector 30)

Next, the injector 30 will be described mainly with reference to FIGS. 4 to 6.

Figure 5:
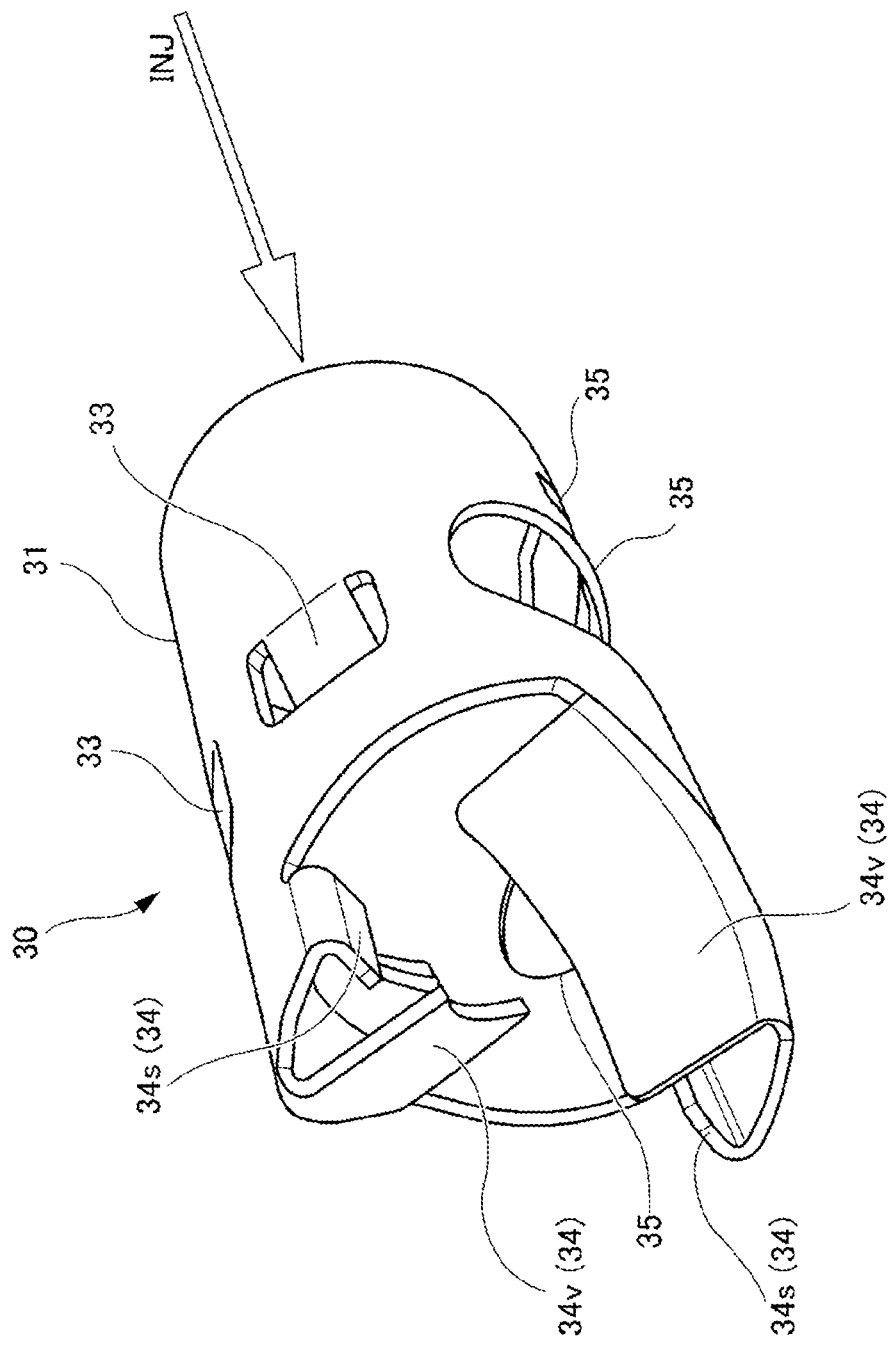
FIG. 5 is a perspective view of an injector main body viewed from the downstream of a helical flow path.

FIG. 5 is a perspective view of an injector main body 31 viewed from the downstream of the helical flow path S2. FIG. 6 is a view of the injector 30 viewed in the injection direction INJ indicated by an arrow in FIG. 4 in which the parts other than the injector main body 31 are not illustrated.

The injector 30 is a device to add a reducing agent such as urea water to the helical flow path S2. As illustrated in FIG. 4, the injector 30 includes: the injector main body 31; a nozzle attachment portion 32 arranged in one end of the injector main body 31, to which a nozzle (not illustrated) for ejecting a reducing agent supplied from a supply source such as a tank and a pump (not illustrated) can be attached; a collision plate 33 arranged on the path of the reducing agent ejected from the nozzle to break up the reducing agent into fine droplets by collision; a control blade 34 arranged in the other end of the injector main body 31 to diffuse the fine droplets of the reducing agent into the exhaust gas in the helical flow path S2; and an intake opening 35 that takes in part of the exhaust gas flowing through the helical flow path S2. The nozzle is arranged such that the injection direction INJ of the reducing agent is set along the helical flow path S2.

The injector main body 31 is cylindrical with open ends, and is arranged such that the axial center thereof extends along the injection direction INJ of the reducing agent from the nozzle and the helical flow path S2. The injector main body 31 has the intake opening 35 at the bottom with respect to the injection direction INJ in the center in the longitudinal direction. Thus, the reducing agent ejected from the nozzle enters through the opening at one end of the injector main body 31 and exits through the opening at the other end. At the same time, the exhaust gas from the upstream side of the helical flow path S2 enters from the intake opening 35 and passes out of the opening at the other end.

The nozzle attachment portion 32 includes a flange having a central opening that serves as a path of the reducing agent ejected from the nozzle and a plurality of attachment holes in the periphery. The nozzle is attached to the flange of the nozzle attachment portion 32 with a bolt or the like. Thereby, the positional relationship between the nozzle and the injector 30 can be reliably defined.

Figure 6:
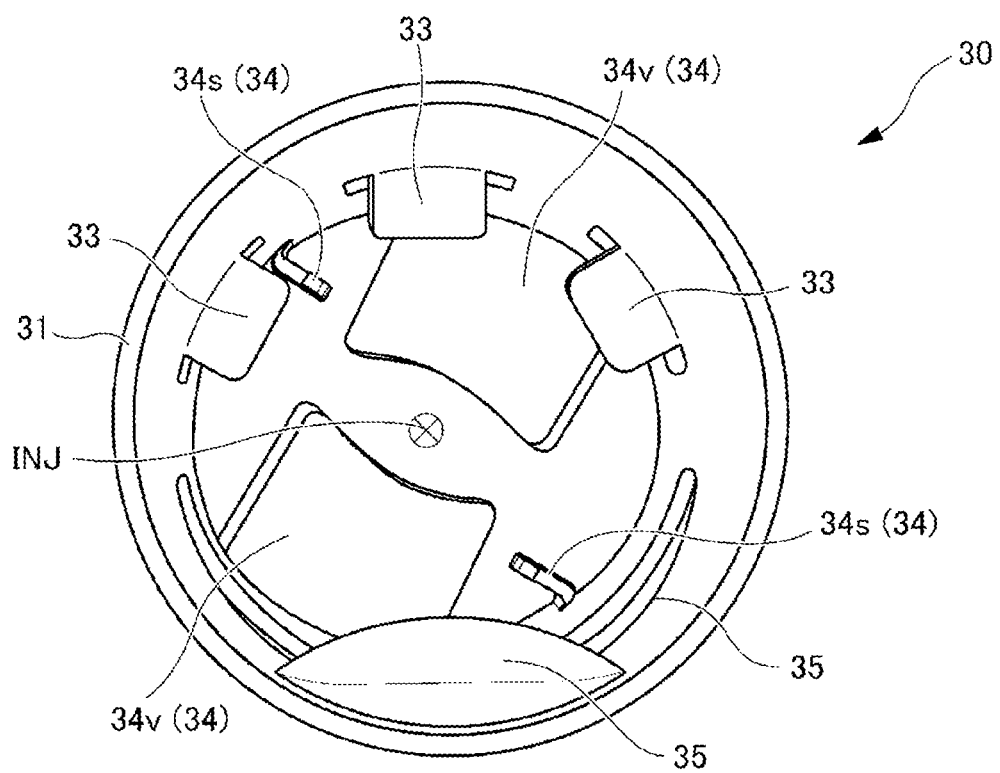
FIG. 6 is a view of an injector viewed in the injection direction INJ indicated by an arrow in FIG. 4 in which the parts other than the injector main body are not illustrated.

As illustrated in FIG. 6, the collision plate 33 is a plate-like member that protrudes to the inside of the injector main body 31 by a predetermined length in the axial direction of the injector main body 31 (the injection direction INJ in FIG. 6) as viewed in the injection direction INJ. Since the collision plate 33 protrudes to the inside of the injector main body 31, a reducing agent such as urea water ejected from the nozzle collides against it and is thereby broken up into fine droplets with a small diameter. In addition, as the collision plate 33 protrudes to the inside of the injector main body 31, it can be maintained at a relatively high temperature by the heat of the exhaust gas. As a result, the thermal decomposition and hydrolysis of the reducing agent can be promoted.

The collision plate 33 may have a length extending from the inner wall of the injector main body 31 to the vicinity of the axial center of the injector main body 31 (near the injection direction INJ in FIG. 6) as viewed in the injection direction INJ. In this case, the reducing agent ejected from the nozzle can collide with the collision plate 33 in a wider range.

The collision plate 33 is formed by cutting a part of the peripheral wall of the injector main body 31 into a U shape and folding the cut part toward the inside of the injector main body 31 at an acute angle (for example, an angle of 10 to 60 degrees). The collision plate 33 is arranged such that the fold line is located upstream and the free end is located downstream in the injection direction INJ of the reducing agent. A portion of the injector main body 31 adjacent to the collision plate 33 is an opening having substantially the same shape as the collision plate 33.

Note that the collision plate 33 need not necessarily be formed by cutting a part of the peripheral wall of the injector main body 31 as described above. A separate plate may be fixed as the collision plate 33 to the inner wall of the injector main body 31 by welding or the like. In this case, the injector main body 31 does not need an opening having substantially the same shape as the collision plate 33 in a portion adjacent to the collision plate 33.

As illustrated in FIG. 6, the collision plate 33 is arranged in the upper part of the peripheral wall of the injector main body 31 as viewed in the injection direction INJ of the reducing agent. This is because the reducing agent ejected from the nozzle is swept upward with respect to the injection direction INJ due to the influence of the exhaust gas flowing through the helical flow path S2. Since the collision plate 33 is arranged in this manner, the swept reducing agent collides with it. In this configuration, the collision plate 33 can be located on the opposite side of the intake opening 35 with respect to the injection direction INJ. Accordingly, the collision plate 33 and the intake opening 35 can be arranged to face each other. As a result, the injector main body 31 can be shortened in length and made compact.

As illustrated in FIG. 6, in the upper part of the peripheral wall of the injector main body 31, a plurality of collision plates 33 are arranged in three locations annularly spaced at an equal pitch (for example, a pitch of approximately 60 degrees). The number of collision plates 33 is not limited to three, and there may be a single collision plate or any number of collision plates other than three.

The plurality of collision plates 33 arranged on the peripheral wall of the injector main body 31 can be formed as follows: integrally forming the collision plates 33 as a part, and then fixing the part to the peripheral wall of the injector main body 31 by appropriate means such as welding.

The control blade 34 is configured to diffuse the reducing agent ejected from the nozzle, including the reducing agent broken up into fine droplets by the collision plate 33, into the exhaust gas in the helical flow path S2.

As illustrated in FIGS. 5 and 6, the control blade 34 is located in the other end of the injector main body 31, and includes a rectifying blade 34s and an intersecting blade 34v. The rectifying blade 34s and the intersecting blade 34v are plate-like members, and can be formed using a cylindrical part as a material by cutting the end of the part and then bending it.

The free end of the rectifying blade 34s has a flat surface substantially parallel to the injection direction INJ of the reducing agent. In this embodiment, two rectifying blades 34s are arranged in opposite positions with respect to the injection direction INJ at the other end of the injector main body 31; however, it is not so limited. There may be a single rectifying blade or any number of rectifying blades other than two.

The free end of the intersecting blade 34v has a flat surface that obliquely intersects the injection direction INJ of the reducing agent. In this embodiment, two intersecting blades 34v are arranged in opposite positions with respect to the injection direction INJ at the other end of the injector main body 31; however, it is not so limited. There may be a single intersecting blade or any number of intersecting blades other than two. Incidentally, the flat surface may be a curved surface that extends along a helical shape. Since the flat surface obliquely intersects the injection direction INJ of the reducing agent, the reducing agent and the exhaust gas flowing in the injection direction INJ are deflected by the flat surface and diffused to flow helically.

Therefore, the exhaust gas and the reducing agent that pass through the injector main body 31 are rectified to flow straight by the flat surface in the free end of the rectifying blade 34s. Then, they are diffused to flow helically by the flat surface in the free end of the intersecting blade 34v. Thereby, a helical flow can be further generated in the helical flow path S2, and the reducing agent can be efficiently mixed in the exhaust gas.

With the control blade 34, the added reducing agent can be broken up into fine droplets. In addition, the thermal decomposition and hydrolysis of the reducing agent can be promoted to generate a helical flow of the fine droplets of the reducing agent. Thus, the reducing agent can be diffused and mixed in the exhaust gas passing through the helical flow path S2. Moreover, the reducing agent can be prevented from remaining attached to the inner wall of the casing 20 because of the high flow rate. Therefore, the nitrogen oxides NOx in the exhaust gas can be efficiently reduced in a short flow distance, i.e., in a limited narrow space.

In the embodiment, two intersecting blades 34v and two rectifying blades 34s are employed in order to form them using a cylindrical part as a material by cutting the end of the part and then bending it; however, it is not so limited. For example, the configuration including three intersecting blades 34v with no rectifying blade 34s can be formed in the same manner, and it can more strengthen the flow that diffuses helically.

(Reducer 40)

Next, the reducer 40 will be described mainly with reference to FIGS. 2 and 3.

As illustrated in FIGS. 2 and 3, the reducer 40 includes an upstream reducer 41 that contracts the flow path from the upstream exhaust flow path S1 toward the upstream opening 21a, and a downstream reducer 42 that expands the flow path from the downstream opening 22a toward the downstream exhaust flow path S3.

The upstream reducer 41 includes an upstream reducer inlet 41in having a cross section equivalent to the cross section of the upstream exhaust flow path S1, and an upstream reducer outlet 41out having a cross section equivalent to the cross section of the upstream opening 21a of the casing 20.

The upstream reducer inlet 41in and the upstream reducer outlet 41out are arranged such that their cross sections are substantially parallel to each other. The cross section of the upstream reducer outlet 41out is smaller than that of the upstream reducer inlet 41in.

As with the upstream opening 21a of the casing 20, the upstream reducer outlet 41out has an elliptical shape, and is arranged eccentrically with respect to the upstream reducer inlet 41in as viewed in the flow direction of the exhaust gas. Because of the elliptical shape of the upstream reducer outlet 41out, even if the upstream reducer outlet 41out is smaller and eccentric with respect to the upstream reducer inlet 41in, the flow path can be secured as much as possible and the flow can be guided smoothly. Thus, it is possible to change the flow rate while reducing the pressure loss.

The upstream reducer 41 is formed so as to connect the upstream reducer inlet 41in and the upstream reducer outlet 41out. The upstream reducer 41 has a side wall 41s that serves as a side surface of a frustum-shaped solid with the upstream reducer inlet 41in and the upstream reducer outlet 41out as the bottom surface. The upstream reducer 41 includes a flange 41f for connecting to the container that has the upstream exhaust flow path S1 formed therein.

Since the upstream reducer 41 has a funnel-like shape as a whole, the flow rate is increased as the flow path becomes narrower. Thereby, the exhaust gas from the upstream exhaust flow path S1 can be smoothly guided to the inside of the casing 20 with less pressure loss while the flow is being deflected to change its direction.

On the other hand, the downstream reducer 42 includes a downstream reducer inlet 42in having a cross section equivalent to the cross section of the downstream opening 22a of the casing 20, and a downstream reducer outlet 42out having a cross section equivalent to the cross section of the downstream exhaust flow path S3.

The downstream reducer inlet 42in and the downstream reducer outlet 42out are arranged such that their cross sections are substantially parallel to each other. The cross section of the downstream reducer outlet 42out is larger than that of the downstream reducer inlet 42in.

As with the downstream opening 22a of the casing 20, the downstream reducer inlet 42in has an elliptical shape, and is arranged eccentrically with respect to the downstream reducer outlet 42out as viewed in the flow direction of the exhaust gas. Because of the elliptical shape of the downstream reducer inlet 42in, even if the downstream reducer inlet 42in is smaller and eccentric with respect to the downstream reducer outlet 42out, the flow path can be secured as much as possible and the flow can be guided smoothly. Thus, it is possible to reduce the pressure loss.

The downstream reducer 42 is formed so as to connect the downstream reducer inlet 42in and the downstream reducer outlet 42out. The downstream reducer 42 has a side wall 42s that serves as a side surface of a frustum-shaped solid with the downstream reducer inlet 42in and the downstream reducer outlet 42out as the bottom surface. The downstream reducer 42 includes a flange 42f for connecting to the container that has the downstream exhaust flow path S3 formed therein.

Since the downstream reducer 42 has a funnel-like shape as a whole, the flow path gradually becomes wider. Thereby, the exhaust gas from the helical flow path S2 can be smoothly guided to the downstream exhaust flow path S3 with less pressure loss.

(Operation of the Exhaust Gas Purification Device 1)

The operation of the exhaust gas purification device 1 until the exhaust gas is purified thereby will be described along the flow of exhaust gas.

As illustrated in FIG. 1, the exhaust gas containing nitrogen oxides NOx discharged from the internal combustion engine ENG is guided to the exhaust gas purification device 1.

Subsequently, the exhaust gas guided to the exhaust gas purification device 1 passes through the oxidation catalyst DOC located in the upstream exhaust flow path S1. At this time, hydrocarbon HC and carbon monoxide CO, which are harmful components in the exhaust gas, are oxidatively purified by the oxidation catalyst DOC.

After passing through the oxidation catalyst DOC, the exhaust gas passes through the diesel particulate filter DPF located in the upstream exhaust flow path S1. At this time, the diesel particulate filter DPF collects or removes particulate matter from the exhaust gas.

Having passed through the diesel particulate filter DPF, the exhaust gas is guided to the mixer 100. In the mixer 100, first, the flow of the exhaust gas that has passed through the diesel particulate filter DPF is deflected by the upstream reducer 41, and the flow rate increases.

After passing through the upstream reducer 41, the exhaust gas flows helically along the helical flow path S2 defined by the casing 20 and the partition plate 10. At this time, part of the exhaust gas that has passed through the upstream reducer 41 flows directly from the upstream side to the downstream side through the pressure loss suppression hole 14. This reduces the concentration of pressure around the pressure loss suppression hole 14. Thereby, the pressure distribution inside the casing 20 can be made uniform.

When the exhaust gas flowing along the helical flow path S2 has passed through a transition portion (near the gate valve 13 of the partition plate 10) between the upstream side and the downstream side in the casing 20, part of the exhaust gas that has passed through the transition portion passes through the intake opening 35 and reaches the inside of the injector main body 31.

At the same time, the urea water, which has been turned into a fine spray or mist as being ejected from the nozzle attached to the injector 30, collides with the collision plate 33 arranged so as to protrude to the inside of the injector main body 31, and is further broken up into fine droplets. The urea water also undergoes a thermal decomposition and hydrolysis to produce ammonia NH3.

The produced ammonia NH3 merges with the exhaust gas that has reached the inside of the injector main body 31. Then, they reaches the control blade 34 while being mixed with each other.

Having reached the control blade 34, the exhaust gas and ammonia NH3 are divided into rectified and helical flows by the control blade 34, and are mixed homogeneously without a large drop in flow rate.

The exhaust gas and ammonia NH3 mixed with each other flow helically as being mixed more homogeneously while maintaining the flow rate, and exit from the casing 20 to reach the downstream reducer 42.

Having reached the downstream reducer 42, the flow of the exhaust gas and ammonia NH3 mixed with each other is gradually deflected by the downstream reducer 42 and turns from a helical flow along the helical flow path S2a to a straight flow along the downstream exhaust flow path S3. As the cross section of the flow path increases, the flow rate is reduced.

Having passed through the downstream reducer 42, the exhaust gas and ammonia NH3 mixed with each other pass through the selective catalytic reduction system SCR located in the downstream exhaust flow path S3.

The nitrogen oxides NOx and ammonia NH3 in the exhaust gas that have reached the selective catalytic reduction system SCR are reduced by the catalyst supported on the selective catalytic reduction system SCR to nitrogen N2 and water H2O.

After passing through the selective catalytic reduction system SCR, the exhaust gas reaches the ammonia slip catalyst ASC located downstream of the selective catalytic reduction system SCR in the downstream exhaust flow path S3. The ammonia slip catalyst ASC removes leftover ammonia NH3 from the exhaust gas that has passed through the selective catalytic reduction system SCR. Then, the nitrogen N2 and water H2O are appropriately released into the outside air.

In this manner, the exhaust gas purification device 1 efficiently purifies nitrogen oxides NOx in the exhaust gas to make the exhaust gas harmless. Thus, the exhaust gas purification device 1 can be made compact as a whole.

While preferred embodiments have been illustrated and described, the disclosure is not limited to these embodiments. Numerous modifications and variations may be made without departing from the spirit and scope of the disclosure as described in the claims.

According to the embodiment, an exhaust gas purification device (1) includes: a selective catalytic reduction device (SCR) arranged in a downstream exhaust flow path (S3); and a mixer (100) arranged upstream of the selective catalytic reduction device (SCR) and including a helical flow path (S2) that helically guides the flow of exhaust gas from an internal combustion engine (ENG). In the exhaust gas purification device (1), the mixer (100) includes: a casing (20) having an upstream opening (21a) and a downstream opening (22a) and provided with the helical flow path (S2) therein; an injector (30) arranged in the helical flow path (S2) to add a reducing agent to the helical flow path (S2); and a partition plate (10) that is continuous from the upstream opening (21a) to the downstream opening (22a). The partition plate (10) is arranged so as to divide the inner space of the casing (20) into an upstream side and a downstream side, and defines the helical flow path (S2). With this configuration, the reducing agent can be homogeneously mixed in the exhaust gas in a short distance, and also the pressure loss of the exhaust gas can be reduced.

Figure 13:
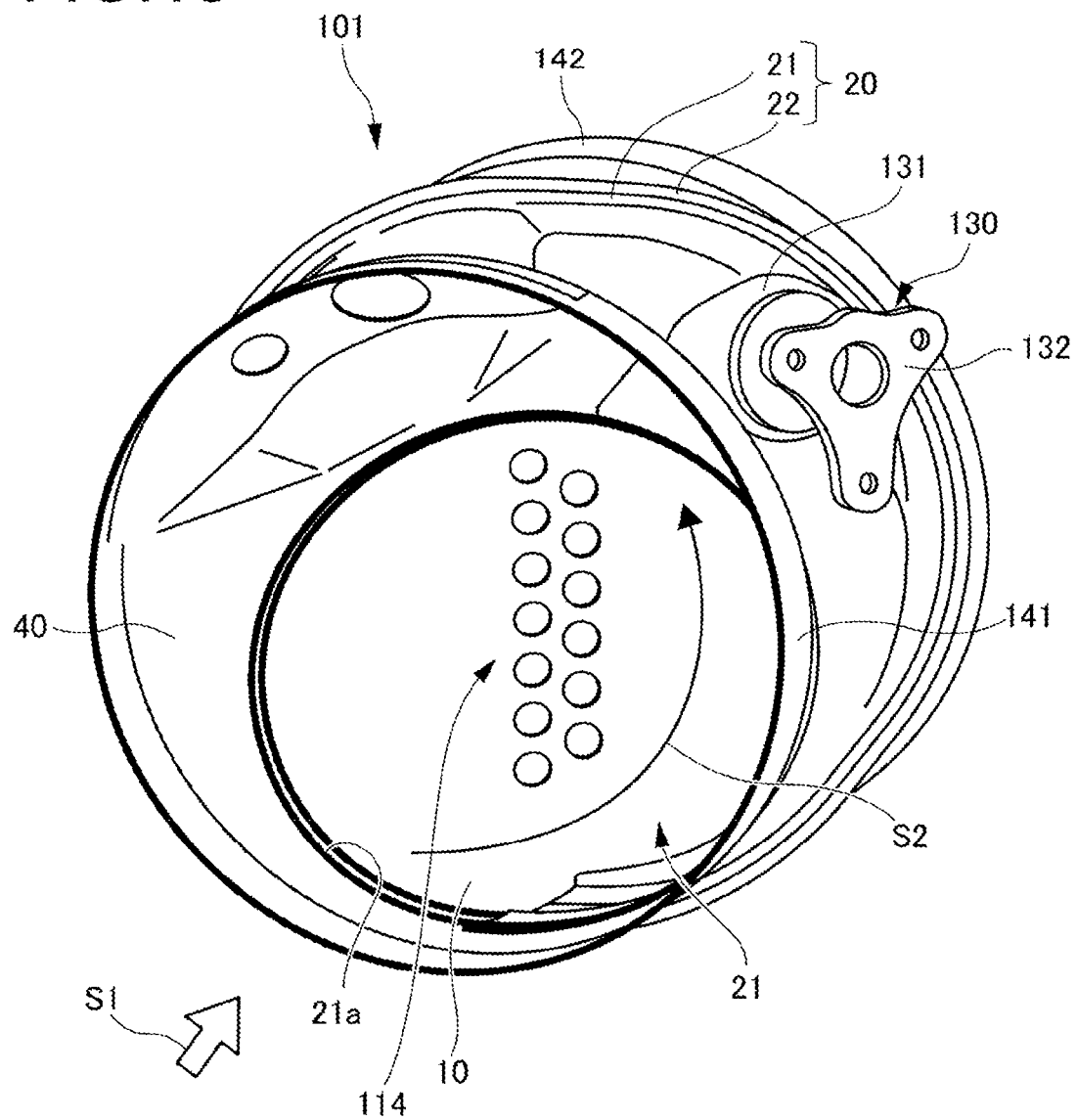
FIG. 13 is a diagram illustrating a mixer of an exhaust gas purification device according to a modification of an embodiment, and is a perspective view of the mixer viewed from the upstream.
Figure 14:
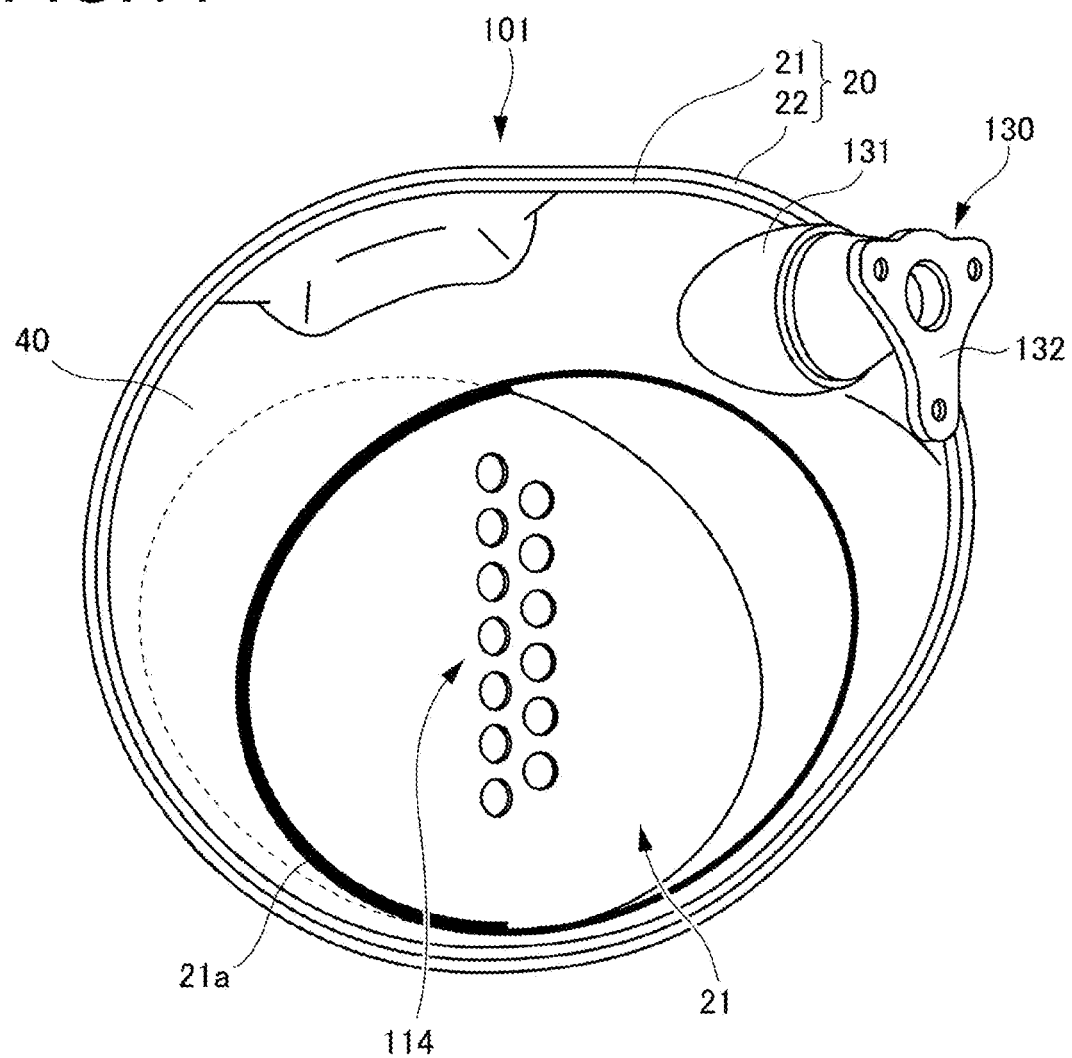
FIG. 14 is a diagram illustrating a modification of the mixer, and is a left side view of the mixer in which a reducer is not illustrated.
Figure 15:
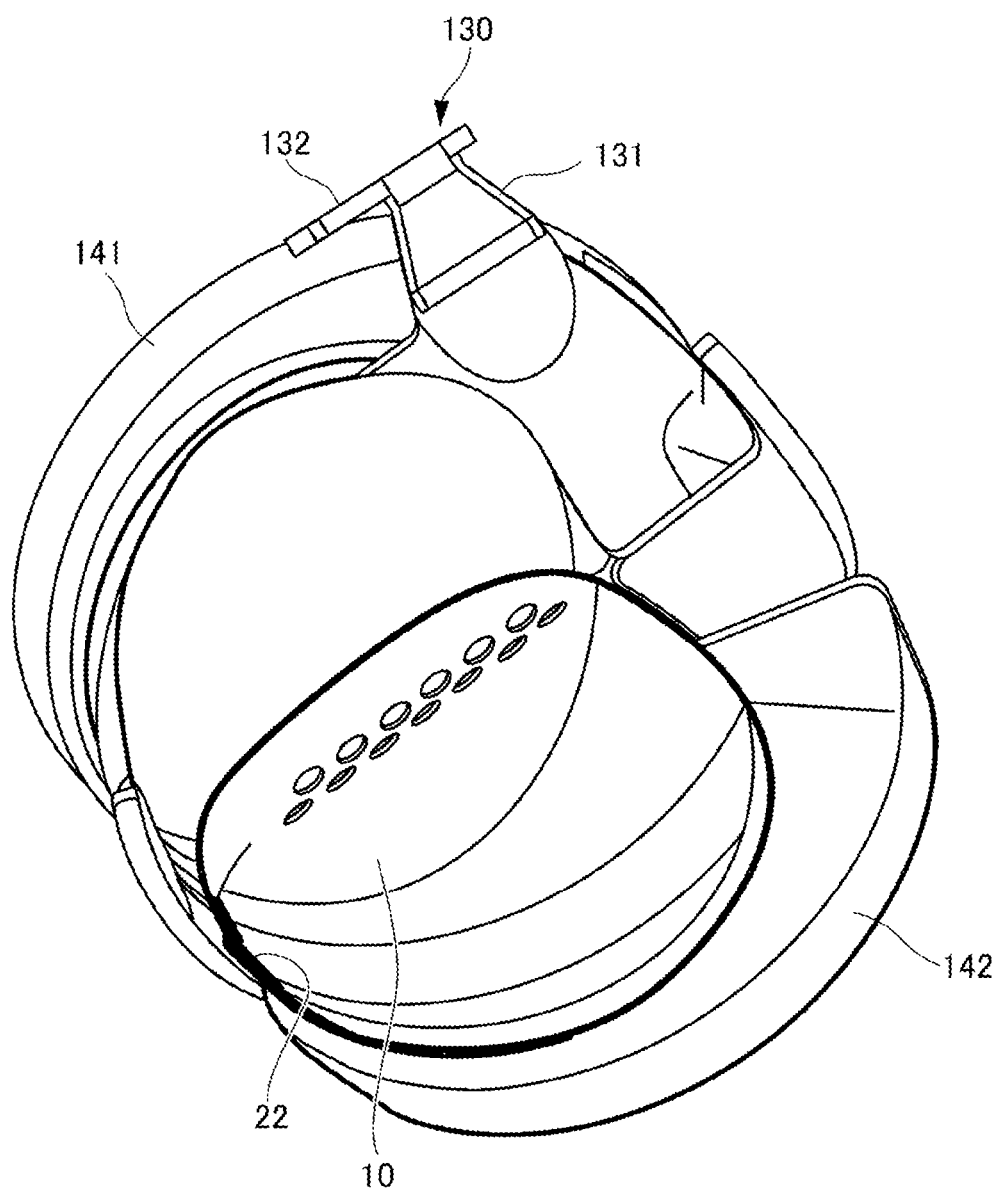
FIG. 15 is a diagram illustrating a modification of the mixer, and is a view corresponding to the cross-sectional view taken along the line B-B in FIG. 8.

Next, modifications of the embodiment will be described with reference to FIGS. 13 to 15. FIG. 13 is a diagram illustrating a mixer of an exhaust gas purification device according to a modification of an embodiment, and is a perspective view of the mixer viewed from the upstream. FIG. 14 is a diagram illustrating a modification of the mixer, and is a left side view of the mixer in which a reducer is not illustrated. FIG. 15 is a diagram illustrating a modification of the mixer, and is a view corresponding to the cross-sectional view taken along the line B-B in FIG. 8.

As illustrated in FIGS. 13 to 15, similarly to the mixer 100, a mixer 101 of the modification includes: the cylindrical casing 20; the partition plate 10 arranged so as to divide the inner space of the casing 20 into an upstream side and a downstream side and defines the helical flow path S2 together with the casing 20; an injector 130 arranged to protrude into the helical flow path S2 to add a reducing agent to the helical flow path S2; and the reducer 40 arranged in a transition portion from the upstream exhaust flow path S1 to the casing 20 as well as a transition portion from the casing 20 to the downstream exhaust flow path S3.

The casing 20 includes the upstream casing 21 and the downstream casing 22. The upstream casing 21 has the upstream opening 21a, while the downstream casing 22 has the downstream opening 22a.

(Injector 130)

As illustrated in FIGS. 13 to 15, the injector 130 includes an injector main body 131 and a nozzle attachment portion 132 arranged in one end of the injector main body 131, to which a nozzle (not illustrated) for ejecting a reducing agent supplied from a supply source such as a tank and a pump (not illustrated) can be attached.

The mixer 101 of the modification is different from the mixer 100 in the position where the injector 130 is located and in that the orientation of the injector 130 is inclined.

The injector main body 131 is cylindrical with open ends, and is arranged such that the axial center thereof extends along the injection direction INJ of the reducing agent from the nozzle. Besides, the injector 130 is arranged such that the axial center thereof is inclined toward the downstream opening 22a. The injector main body 131 is arranged such that the axial center thereof extends from the vicinity of the upstream opening 21a of the upstream casing 21 across the downstream opening 22a.

In the mixer 100 described above, the partition plate 10 is provided with the pressure loss suppression hole 14. The pressure loss suppression hole 14 includes one hole in the center and six holes around it. A total of seven holes are arranged side by side at equal pitches such that lines connecting the centers of the six holes form a regular hexagon.

In the mixer 101 of the modification, the partition plate 10 is provided with a pressure loss suppression hole 114 including a total of 13 holes: a row of seven holes and a row of six holes.

In the mixer 100 described above, the upstream reducer 41 and the downstream reducer 42 include the flange 41f and the flange 42f, respectively. On the other hand, in the mixer 101 of the modification, an upstream reducer 141 and a downstream reducer 142 include no flange.

The mixer 100 described above includes the gate valve 13 that prevents the backflow, while the mixer 101 of the modification is configured without the gate valve for preventing the backflow.

As indicated by the broken line in FIG. 4, in the mixer 100 described above, the injector main body 31 is arranged so as to protrude to the inside of the mixer 100. On the other hand, in the mixer 101 of the modification, the injector main body 131 may also be configured not to protrude to the inside of the mixer 101. With this configuration, the pressure loss of the exhaust gas can be reduced in the helical flow path S2.

While certain embodiments have been illustrated and described herein, it is to be understood that the scope of the inventions is not limited to the specific embodiments. As would be apparent to those skilled in the art, various changes, modifications, and alterations may be made without departing from the spirit and scope of the disclosure as described in the claims.

What is claimed is:

1. An exhaust gas purification device comprising:
   a selective catalytic reduction device located in a downstream exhaust flow path; and
   a mixer located upstream of the selective catalytic reduction device,
   wherein the mixer comprises:
      a helical flow path that helically guides a flow of exhaust gas from an internal combustion engine,
      a casing comprising a cylindrical first case that forms an upstream opening on one end of the first case, and a cylindrical second case that forms a downstream opening on one end of the second case, wherein another end of the first case is coupled to another end of the second case, the casing having a cylindrical inner space where the upstream opening and the downstream opening directly communicate with each other,
      a partition plate formed of a piece separate from the casing and coupled to the first case and the second case, the partition plate configured to divide the cylindrical inner space of the casing into an upstream side and a downstream side so as to define the helical flow path in the cylindrical inner space of the casing, and
      an injector configured to add a reducing agent to the helical flow path, and
   wherein the upstream opening and the downstream opening are arranged eccentrically with respect to a center of the casing so as to partially overlap with each other as viewed in a flow direction.

2. The exhaust gas purification device according to claim 1, wherein
   the upstream opening is narrower than an upstream exhaust flow path from the internal combustion engine, and the downstream opening is narrower than the downstream exhaust flow path.

3. The exhaust gas purification device according to claim 1, wherein the partition plate is continuous from the upstream opening to the downstream opening.

4. The exhaust gas purification device according to claim 1, wherein the upstream opening is located eccentrically opposite to a position of the injector with respect to the center of the casing as viewed in the flow direction.

5. The exhaust gas purification device according to claim 1, wherein the upstream opening is arranged so as not to overlap a position of the injector as viewed in the flow direction.

6. The exhaust gas purification device according to claim 1, wherein the upstream opening and the downstream opening are arranged symmetrically as viewed in the flow direction.

7. The exhaust gas purification device according to claim 1, wherein the partition plate is horizontally symmetrical about a vertical center line of a portion where the upstream opening and the downstream opening overlap.

8. The exhaust gas purification device according to claim 1, wherein a portion where the upstream opening and the downstream opening overlap is located in the center of the casing as viewed in the flow direction.

9. The exhaust gas purification device according to claim 1, wherein the partition plate includes a pressure loss suppression hole that allows the exhaust gas to pass from upstream to downstream.

10. The exhaust gas purification device according to claim 9, wherein the partition plate includes the pressure loss suppression hole in a portion where the upstream opening and the downstream opening overlap as viewed in the flow direction.

11. The exhaust gas purification device according to claim 1, wherein the partition plate includes a gate valve that prevents backflow.

12. The exhaust gas purification device according to claim 1, wherein the injector is arranged such that an axial center of the injector is inclined toward the downstream opening.

* * * * *